United States Patent
Sharma

(10) Patent No.: US 8,838,983 B2
(45) Date of Patent: *Sep. 16, 2014

(54) ARTICLE OF MANUFACTURE FOR SECURING DATA IN 2D BAR CODES USING SSL

(71) Applicant: The Vanguard Group, Inc., Malvern, PA (US)

(72) Inventor: Rajeev Sharma, Downingtown, PA (US)

(73) Assignee: The Vanguard Group, Inc., Malvern, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/212,205

(22) Filed: Mar. 14, 2014

(65) Prior Publication Data

US 2014/0201823 A1 Jul. 17, 2014

Related U.S. Application Data

(63) Continuation of application No. 13/294,548, filed on Nov. 11, 2011, now Pat. No. 8,677,131.

(51) Int. Cl.
```
H04L 29/06    (2006.01)
G06F 21/36    (2013.01)
G06F 21/64    (2013.01)
H04L 9/32     (2006.01)
```

(52) U.S. Cl.
CPC ............... *G06F 21/36* (2013.01); *H04L 9/3226* (2013.01); *G06F 21/64* (2013.01); *H04L 63/123* (2013.01); *H04L 63/0823* (2013.01)
USPC ....................... 713/176; 382/100; 235/462.01

(58) Field of Classification Search
USPC ................... 713/176; 382/100, 141; 235/375, 235/462.01
See application file for complete search history.

(56) References Cited

U.S. PATENT DOCUMENTS

| 5,905,801 A | 5/1999 | Serinken |
| 7,506,812 B2 | 3/2009 | von Mueller et al. |

(Continued)

FOREIGN PATENT DOCUMENTS

| JP | 2008099058 A | 4/2008 |
| JP | 2008134985 A | 6/2008 |
| JP | 2008282238 A | 11/2008 |

OTHER PUBLICATIONS

Wikipedia entry for "QR Code." Printout from web page: http://en.wikipedia.org/w/index.php?title=QR_code&printable=yes, page last modified Jan. 30, 2011, 7 pages.QR Code printout from Wikipedia, the free encyclopedia.

(Continued)

*Primary Examiner* — Victor Lesniewski
(74) *Attorney, Agent, or Firm* — Panitch Schwarze Belisario & Nadel LLP

(57) ABSTRACT

An article of manufacture comprises a printed document associated with a source entity. The printed document is readable by a software application of an electronic device. The printed document includes a plain text content portion and a two-dimensional code (2-D code) that includes data encoded therein which is readable by the software application of the electronic device. The encoded data includes a resource locator to an intent. The resource locator to an intent includes a protocol identifier designating a secure 2-D code which is detectable by the software application of the electronic device for electronic replacement by the software application with a protocol identifier used to access a secure server of the source entity located at a host portion of the resource locator. The protocol identifier is a protocol identifier associated with URL specifications.

5 Claims, 4 Drawing Sheets

(56) References Cited

U.S. PATENT DOCUMENTS

| | | |
|---|---|---|
| 7,743,254 B2 | 6/2010 | Sauve et al. |
| 7,860,268 B2 | 12/2010 | Alasia et al. |
| 7,891,545 B2 | 2/2011 | Ikeda |
| 8,261,972 B2 | 9/2012 | Ziegler |
| 8,272,562 B2 | 9/2012 | Ziegler |
| 8,296,477 B1 | 10/2012 | Polk |
| 2003/0034399 A1 | 2/2003 | Wilz et al. |
| 2003/0118191 A1 | 6/2003 | Wang et al. |
| 2003/0173405 A1 | 9/2003 | Wilz et al. |
| 2007/0108287 A1 | 5/2007 | Davis et al. |
| 2007/0215685 A1 | 9/2007 | Self et al. |
| 2008/0256087 A1 | 10/2008 | Piironen et al. |
| 2009/0008445 A1 | 1/2009 | Chen et al. |
| 2009/0031373 A1 | 1/2009 | Hogyoku |
| 2009/0108057 A1 | 4/2009 | Mu et al. |
| 2009/0270124 A1* | 10/2009 | Yamada et al. ............ 455/556.1 |
| 2009/0300106 A1 | 12/2009 | Woodside et al. |
| 2009/0307232 A1 | 12/2009 | Hall |
| 2009/0316950 A1 | 12/2009 | Alasia et al. |
| 2010/0063893 A1 | 3/2010 | Townsend |
| 2011/0002012 A1 | 1/2011 | Amagai |
| 2011/0113340 A1 | 5/2011 | Miyazawa et al. |
| 2011/0150266 A1 | 6/2011 | Hohndel |
| 2012/0138671 A1 | 6/2012 | Gaede et al. |
| 2012/0199647 A1 | 8/2012 | Hwang et al. |
| 2012/0209686 A1 | 8/2012 | Horowitz et al. |
| 2012/0280031 A1 | 11/2012 | Nelson et al. |
| 2012/0308003 A1 | 12/2012 | Mukherjee |
| 2012/0316950 A1 | 12/2012 | LaPorte et al. |
| 2012/0325901 A1 | 12/2012 | Ross |
| 2013/0001291 A1 | 1/2013 | Ibrahimbegovic et al. |
| 2013/0043302 A1 | 2/2013 | Powlen et al. |
| 2013/0060591 A1 | 3/2013 | Meegan |
| 2013/0068831 A1 | 3/2013 | Cok et al. |
| 2013/0073687 A1 | 3/2013 | Cok et al. |
| 2013/0111208 A1 | 5/2013 | Sabin et al. |

OTHER PUBLICATIONS

RFC 1123, Section 2.1, Internet Engineering Task Force, printout from web page: http://www.ietf.org/rfc/rfc1123.txt, Oct. 1989, 1 page.

Wikipedia entry for Transport Layer Security, printout from web page: http://en.wikipedia.org/wiki/Transport_layer_security, downloaded 2011, 16 pages.

About Tag. Connecting Real Life and the Digital World using Mobile Barcodes. Printout from website address: http://tag.microsoft.com/overview.aspx, printout date Jul. 6, 2011.

Mohammad Mannan et al. "Mercury: Recovering Forgotten Passwords Using Personal Devices," Pre-proceedings of Financial Cryptography and Data Security 2011, Dec. 17, 2010, printout from web page: http://www.eecg.toronto.edu/~lie/papers/mannan-fc2011.pdf, 16 pages.

Isaac Potoczny-Jones, "Quick authentication using mobile devices and QR Codes," Copyright © 2011 Galois, Inc., printout from web page: http://corp.galois.com/blog/2011/1/5/quick-authentication-using-mobile-devices-and-qr-codes.html, Jan. 5, 2011, and reader (blog) comments dated Jan. 2011 and Feb. 2011, 10 pages.

Al-Khalifa, Hend S.: "Mobile SRS: A Classroom Communication and Assessment Service", International Conference on Innovations in Information Technology, Dec. 16-18, 2008, pp. 342-346.

Liu, Chung-Hsin; Chou, Chia-Hong; "Two-dimensional bar code mobile commerce—Implementation and Performance Analysis", Sixth International Conference on Networked Computing and Advanced Information Management (NCM), Aug. 16-18, 2010, pp. 632-635.

Finzgar, Luk; Trebar, Mira; "Use of NFC and QR code Identification in an Electronic Ticket System for Public Transport", 19th International Conference on Software, Telecommunications and Computer networks (SoftCOM), Sep. 15-17, 2011, pp. 1-6.

* cited by examiner

Sample protocol identifiers from the URL specifications

| | |
|---|---|
| http | Hypertext Transfer Protocol |
| ftp | File transfer protocol |
| gopher | The Gopher protocol |
| mailto | Electronic mail address |
| mid | Message identifiers for electronic mail |
| cid | Content identifiers for MIME body part |
| news | Usenet news |
| nntp | Usenet news for local NNTP access only |
| prospero | Access using the prospero protocols |
| telnet, rlogin & tn3270 | Reference to interactive sessions |
| wais | Wide area information servers |

Figure 3 (Prior Art)

ARTICLE OF MANUFACTURE FOR SECURING DATA IN 2D BAR CODES USING SSL

CROSS-REFERENCE TO RELATED APPLICATIONS

This application is a continuation of copending U.S. patent application Ser. No. 13/294,548 filed Nov. 11, 2011, which is incorporated herein by reference.

BACKGROUND OF THE INVENTION

Two-dimensional bar codes, also referred to as "two-dimensional codes" or "2-D codes," are patterns with data encoded therein. The encoded data may be text, a URI/URL or raw data. One form of a 2-D code is a matrix barcode (data matrix code) which consists of black and white cells or modules arranged in either a square or rectangular pattern. Another form of a 2-D code uses clusters of triangles, such as the Microsoft® Tag and the Microsoft High Capacity Color Barcode (HCCB). One commonly used 2-D matrix-type code is a QR code which consists of black modules arranged in a square pattern on a white background. QR is an abbreviation for "Quick Response." The QR code is described in U.S. Pat. No. 5,726,435 (Hara et al.).

One common use of a 2-D code is for "hardlinking" or "object hyperlinking" which refers to the act of linking from physical world objects. The 2-D code is used to encode a URI/URL, which is then printed on a document, such as a page in a newspaper or magazine, brochure, billboard, sign, or business card. Software downloaded into an electronic device, such as smartphone, is then used in conjunction with a camera (e.g., camera phone) to read/scan the 2-D code, decode the URI/URL in the 2-D code, and then navigate to the location/site (e.g., web page) of the URI/URL and display the contents on a browser associated with the electronic device. In this manner, the 2-D code can act as a pointer to a robust store of information that the document owner wishes to share. The location/site of the URI/URL (i.e., the location that you ultimately want to navigate to, such as to learn more about a product displayed in printed material) is one example of what is referred to herein as the "intent." The "intent" may also be any other commands that the software of the electronic device can execute. The final step in the process is for the intent to be selected, typically by user selection, such as clicking on the intent. Other examples of an intent as used herein include, but are not limited to, an email address, a telephone number, contact information (e.g., vCard), SMS, MMS, geographic information (e.g., geo URI), a Wifi network configuration, or a storage location from which software packages may be retrieved and installed on a device (software repository, such as an app store).

As 2-D codes become more popular, security issues are likely to arise, particularly when 2-D codes are used in public locations, such as on billboards and signs. For example, if a company wishes to promote its product or brand in a sign or billboard campaign by encouraging a user/viewer to scan the 2-D code, a hacker may print a 2-D code of a similar size and attach it over the originally printed 2-D code, thereby directing the unsuspecting person who scans the 2-D code to a different web page where unexpected and unwanted content is displayed, or where a computer virus can potentially infect the user's device. Security breaches could also occur in the original printing of the 2-D code, wherein an incorrect 2-D code is deliberately printed by someone who has hacked into the printing software. In this instance, large numbers of documents could be inadvertently distributed with a different 2-D code than the owner of the printed documents intended. Likewise, if a 2-D code is electronically displayed, such as on web page or a public display, a hacker could electronically replace the correct 2-D code with an unintended or malicious 2-D code.

Accordingly, there is a need to address these types of potential security issues so that a user has some level of assurance that the intent obtained from the 2-D code can be trusted.

BRIEF SUMMARY OF THE INVENTION

Methods and apparatus authenticate a printed document associated with a source entity. The printed document includes a two-dimensional code (2-D code) that includes data encoded therein. The encoded data includes a resource locator to an intent. One or more software applications executing on an electronic device receive an image of the 2-D code, decode the image of the 2-D code to obtain the resource locator to an intent, and detect whether the resource locator to an intent includes a protocol identifier designating a secure 2-D code. Upon detecting that the protocol identifier designates a secure 2-D code, the one or more software applications electronically replaces the protocol identifier designating a secure 2-D code with a protocol identifier used to access a secure server of the source entity located at a host portion of the resource locator, accesses a server resource at the secure server to obtain the intent, receives a certificate of the secure server and extracts information from the certificate, including information regarding whether the certificate is valid, and outputs to the electronic device one or more indicators of whether the certificate is valid and a display of the intent. The one or more of the outputs may be used to decide whether the intent can be trusted.

BRIEF DESCRIPTION OF THE DRAWINGS

Some embodiments of the present invention will now be described by way of example with reference to the accompanying drawings:

FIG. 3 is a prior listing of sample protocol identifiers.

DETAILED DESCRIPTION OF THE INVENTION

Certain terminology is used herein for convenience only and is not to be taken as a limitation on the present invention. For the purposes of explaining the present invention, specific embodiments will be described. These embodiments are exemplary only, and are not intended to limit the scope of the invention.

One preferred embodiment of the present invention is described with respect to a QR code. However, the scope of the present invention includes other forms of 2-D codes, as discussed above.

Figure 1:
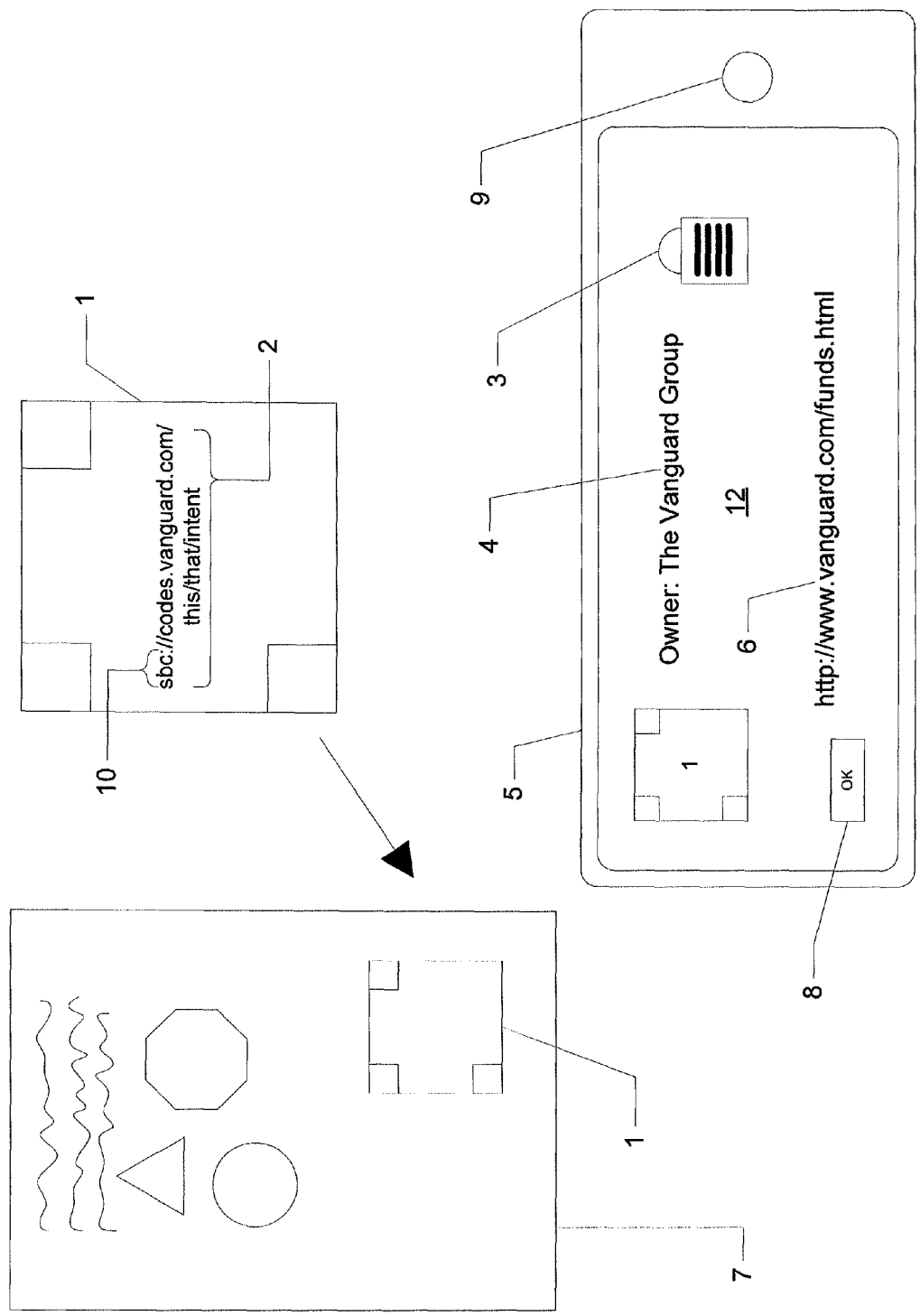
FIG. 1 is a diagram of printed material and an electronic device that scans the printed material, in accordance with one preferred embodiment of the present invention.

Referring to FIG. 1, the preferred embodiment provides a method of authenticating a printed document 7 associated with a source entity. In this example, the source entity is the assignee of the present application, namely, The Vanguard Group, Inc. (Vanguard). The printed document 7 may be any type of printed material associated with Vanguard, such as a sign, billboard, prospectus, or account statement. The printed document 7 includes a 2-D code 1 that includes data encoded therein, and content indicated by swiggly lines and geometrical shapes. The encoded data includes a resource locator 2 to an intent. Here, the decoded human readable resource locator 2 is "codes.vanguard.com/this/that/intent." The encoded data also includes a protocol identifier 10 for the resource locator 2. The resource locator 2 effectively acts as a pointer to the intent. Protocol identifiers are described in the URL specifications located at: HyperText Transfer Protocol://WorldWideWeb[dot]w3[dot]org/Addressing/URL/url-spec[dot]txt. In the example above wherein the resource locator 2 to an intent is "codes.vanguard.com/this/that/intent," the host portion of the resource locator 2 is "codes.vanguard.com." A "host" is a legal Internet host domain name or IP address as defined by Section 2.1 of RFC 1123.

FIG. 3 shows sample protocol identifiers from the URL specifications. The most common protocol used today is http. The URL specifications allow for new protocols to be defined. The preferred embodiment defines a new protocol generically called "sbc" (secure bar code), or, alternatively, called sqrc (secure QR code) when used with QR codes. In the example of FIG. 1, the identifier for the new protocol is referred to as "sbc" which becomes a prefix to the resource locator 2 "codes.vanguard.com/this/that/intent," and which reads in its full format as "sbc://codes.vanguard.com/this/that/intent."

FIG. 1 also shows an electronic device 5. The electronic device 5 may be a mobile device such as a smartphone, laptop or tablet PC, or it may be a fixed electronic device, such as a desktop computer with a webcam. The electronic device 5 includes one or more software applications that are capable of decoding one or more types of 2-D bar codes, and performing various processing and navigating functions described below. The electronic device 5 also includes a display 12. In the example of FIG. 1, the electronic device 5 is a smartphone with a touchscreen display, wherein most of the front face of the smartphone is the display 12, similar to smartphones such as the Apple® iPhone®.

Figure 2:
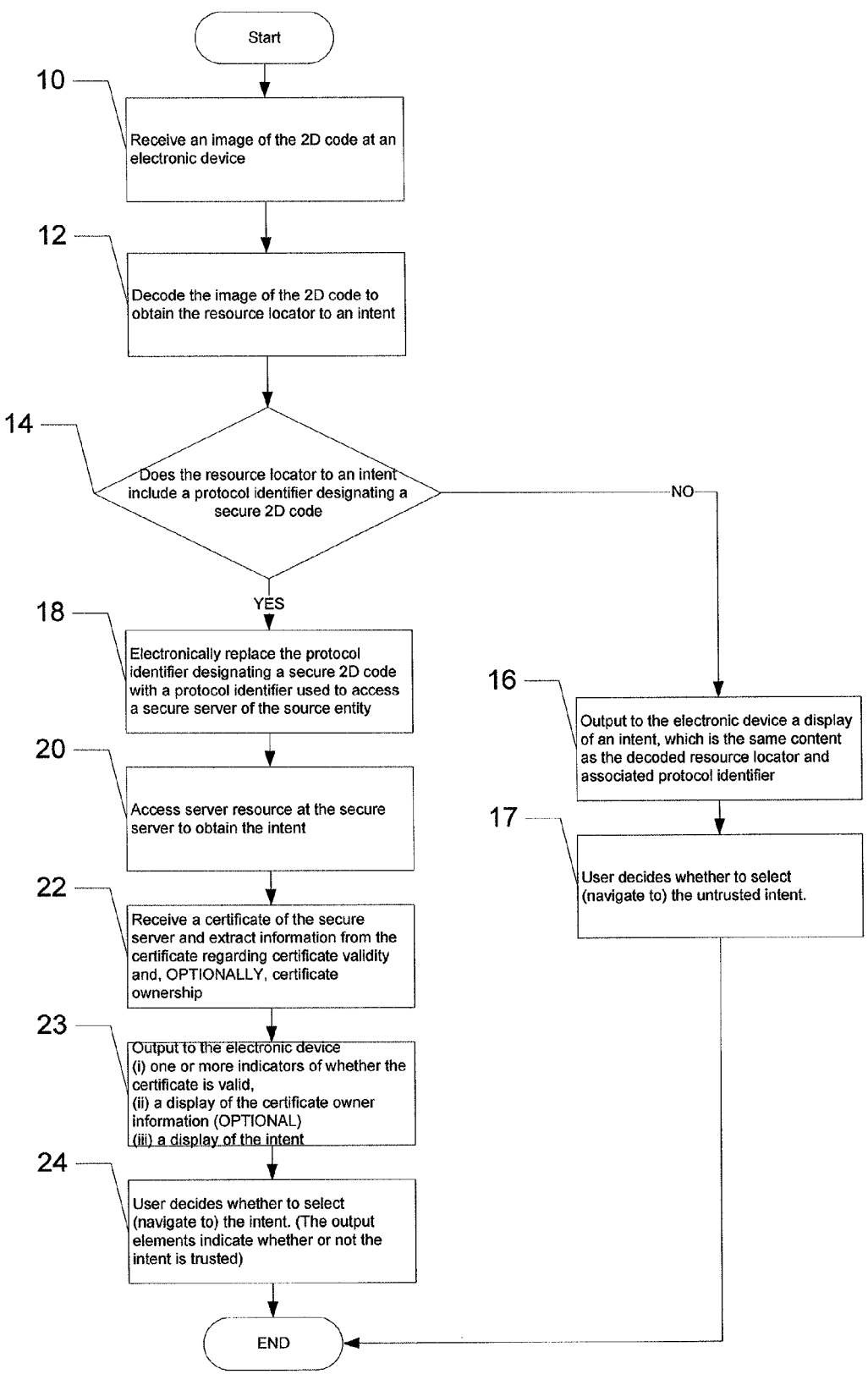
FIG. 2 is a flowchart for implementing one preferred embodiment of the present invention.

Referring to FIGS. 1 and 2, the software application executing on the electronic device 5 receives an image of the 2-D code 1, such as from the device's camera 9 (step 10). The image 1 may appear on the display 12. The software application decodes the image of the 2-D code to obtain the resource locator 2 to an intent, which includes any associated protocol identifier 10 of the resource locator (step 12). Software for decoding 2-D codes, such as QR codes, are well-known in the art and can be downloaded for free from any number of sources.

The software application then detects whether the resource locator 2 to an intent includes a protocol identifier 10 designating a secure 2-D code (step 14). If the resource locator 2 does not include a protocol identifier 10 designating a secure 2-D code ("NO" output of step 14), then the electronic device 5 simply outputs a display of the resource locator 2 with the protocol identifier 10, if one is present (step 16). That is, the electronic device 5 outputs a display of an intent 6, which is the same content as the resource locator 2 and associated protocol identifier 10 that was decoded from the 2-D code 1. For example, if the resource locator 2 to an intent and the associated protocol identifier 10 of the intent reads "http://codes.vanguard.com/this/that/intent," the display would simply show "http://codes.vanguard.com/this/that/intent" without any indication that this intent can be trusted (none of the indicators discussed below would be output by the electronic device 5. The user would then decide whether or not to navigate to that intent by clicking on an OK button 8 (step 17).

On the other hand, if the resource locator 2 to an intent includes a protocol identifier 10 designating a secure 2-D code ("YES" output of step 14), the software application, performs the following additional steps:

(1) Electronically replaces the protocol identifier designating a secure 2-D code with a protocol identifier used to access a secure server of the source entity (step 18). In the example of FIG. 1, "sbc://codes.vanguard.com/this/that/intent" is replaced by "https://codes.vanguard.com/this/that/intent."

(2) Accesses a server resource at the secure server to obtain the intent (step 20). In the example of FIG. 1, the software application opens an SSL/TLS connection using the replaced protocol identifier. (Transport Layer Security (TLS) and Secure Sockets Layer (SSL) are cryptographic protocols that provide communication security over the Internet. TLS and SSL encrypt the segments of network connections above the Transport Layer.)

(3) Receives a certificate of the secure server and extracts from the certificate information regarding whether the certificate is valid and, optionally, certificate owner information (step 22).

(4) Outputs to the electronic device 5 at least the following two items (step 23):

(i) one or more indicators of whether the certificate is valid, and (ii) a display of the intent 6.

The electronic device 5 would preferably further output a third item, namely, (iii) a display of the certificate owner information 4. Thus, in the preferred embodiment, all three items would be output.

In an alternative embodiment, only the one or more indicators of whether the certificate is valid and a display of the intent 6 would be output to the electronic device 5. For example, the certificate validity and/or the display of the intent may provide sufficient assurance to the user that the intent can be trusted, without further viewing the certificate owner information. In other instances, the certificate owner information may not provide any further assurances that the intent may be trusted and may even cause the user to question whether the intent may be trusted. For example, if the certificate owner information is a name that is different from, and/or not readily associated with the source entity of the printed document 7, the user may question whether the intent may be trusted, even if the certificate is valid and the display of the intent appears to match the source entity of the printed document 7. To maximize the effectiveness of the present invention, the source entity will ideally obtain and use a certificate that has an owner name that is readily associated with the printed document 7, and will also use an intent that provides a clear association to the source entity.

The secure server may be a secure web server (i.e., a server on the Web that supports a security protocol, such as SSL or TLS). A session managed by a security protocol may be initiated to perform steps (2) and (3), wherein the protocol identifier used to access the secure server may be HTTPS.

Most browsers provide a selection button to view certificate information and details. The certificate details includes the owner information and the valid start and end date of the certificate. This information can be easily extracted by the software application (e.g., browser) to provide the required outputs. Certificate information and details are well-known, and thus are not described in further detail.

The indicators and the displayed owner information may be used by a person viewing the electronic device 5 to decide whether the intent 6 is from the source entity, and therefore whether the intent 6 can be trusted. If so, the user can then select (e.g., navigate) to the intent 6 with confidence (step 24). The one or more indicators may be similar to the conventional lock symbol or a color change that is used by browsers such as Microsoft Internet Explorer® and GOOGLE® CHROME™ to communicate that a certificate is valid. Other indicators may also be used, such as warnings, sound, and vibration. The example of FIG. 1 shows a lock symbol 3.

The owner information 4 is what the user of the electronic device 5 visually compares to the printed document 7. In the example of FIG. 1, the owner information is "The Vanguard Group." Vanguard is thus an owner of a valid SSL certificate. The user can then compare this information to the printed document 7 which is associated with Vanguard. The intent 6 may also provide additional information that the user can compare to the printed document 7. In the example of FIG. 1, the intent 6 includes the text string "vanguard."

The display of the intent 6 in the example of FIG. 1 is: "http://personal.vanguard.com/funds.html," which can be navigated to by clicking on the OK button 8.

As described above, the resource locator may be a URI, such as a URL. However, other types of resource locators are within the scope of the present invention.

Figure 4:
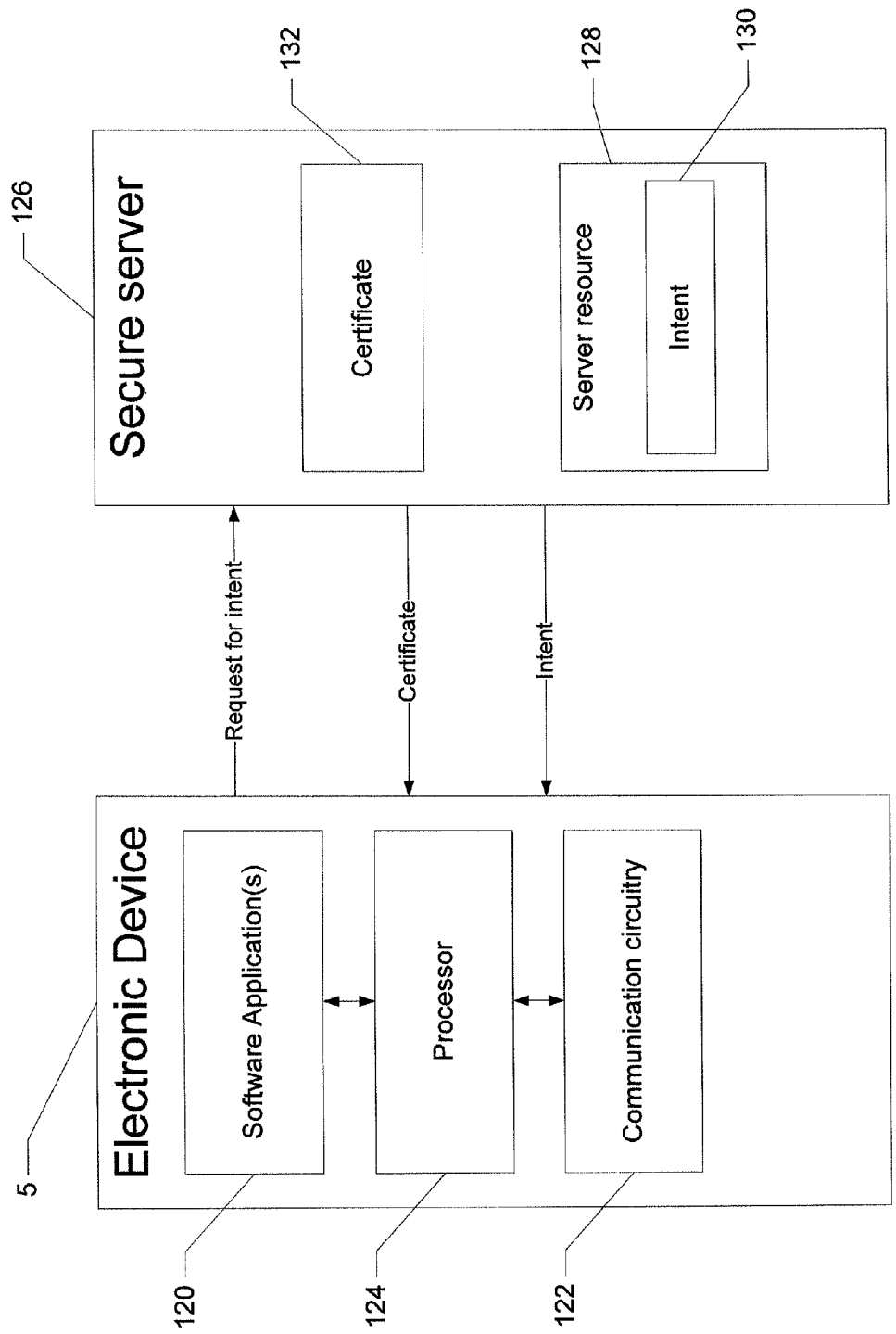
FIG. 4 is a hardware/software schematic diagram of the elements of the electronic device and secure server that are used in accordance with one preferred embodiment of the present invention.

FIG. 4 is a hardware/software schematic diagram of the elements of the electronic device 5 that are used to authenticate the printed document 7. The electronic device 5 includes one or more software applications 120 that are programmed to perform the functions discussed above, communication circuitry 122 for wired and/or wireless communication with a secure server 126, and a processor 124 for executing the software functions and assisting in executing the communication functions. In devices such as a smartphone, the processor 124 may share its functionality with other smartphone applications. One of the software applications 120 may be a browser for rendering some or all portions of the display 12. The communication circuitry 122 may comprise any conventional communication circuitry used in existing computers or smartphones for accessing remote sites, such as web sites available via the Internet.

Referring to FIGS. 1, 2 and 4, if the resource locator 2 to an intent includes a protocol identifier 10 designating a secure 2-D code ("YES" output of step 14), the electronic device 5 accesses a server resource 128 at the secure server 126 to obtain the intent 130 and certificate 132, as discussed above.

The present invention may be implemented with any combination of hardware and software. If implemented as a computer-implemented apparatus, the present invention is implemented using means for performing all of the steps and functions described above.

When implemented in software, the software code can be executed on any suitable processor or collection of processors, whether provided in a single computer or distributed among multiple computers.

The present invention can also be included in an article of manufacture (e.g., one or more computer program products) having, for instance, computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computers used herein may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smartphone or any other suitable portable, mobile, or fixed electronic device.

The computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. An article of manufacture comprising a printed document associated with a source entity, the printed document being readable by a software application of an electronic device, the printed document including:

(a) a plain text content portion; and
   (b) a two-dimensional code (2-D code) that includes data encoded therein which is readable by the software application of the electronic device, the encoded data including a resource locator to an intent, the resource locator to an intent including a protocol identifier designating a secure 2-D code which is detectable by the software application of the electronic device for electronic replacement by the software application with a protocol identifier used to access a secure server of the source entity located at a host portion of the resource locator, and wherein the protocol identifier is a protocol identifier associated with URL specifications.

2. The article of manufacture of claim 1 wherein the electronic device is a mobile device.

3. The article of manufacture of claim 2 wherein the mobile device is a smartphone.

4. The article of manufacture of claim 1 wherein the resource locator is a URI.

5. The article of manufacture of claim 4 wherein the URI is a URL.

\* \* \* \* \*